United States Patent [19]

Waite

[11] Patent Number: 4,496,397
[45] Date of Patent: Jan. 29, 1985

[54] PROCESS FOR PURIFYING AND STABILIZING CATECHOL-CONTAINING PROTEINS AND MATERIALS OBTAINED THEREBY

[75] Inventor: J. Herbert Waite, Collinsville, Conn.

[73] Assignee: University of Connecticut, Farmington, Conn.

[21] Appl. No.: 587,181

[22] Filed: Mar. 7, 1984

[51] Int. Cl.$^3$ .......................... A23J 1/04; C07G 7/00; C08L 89/00; C09J 3/20
[52] U.S. Cl. .................................. 106/161; 106/124; 106/160; 260/112 R
[58] Field of Search ...................... 106/124, 160, 161; 260/112 R

[56] References Cited

U.S. PATENT DOCUMENTS

| | | | |
|---|---|---|---|
| 2,602,031 | 7/1952 | Ugelstad | 106/161 |
| 4,390,468 | 6/1983 | Sasaki et al. | 260/112 R |
| 4,402,874 | 9/1983 | Johnson et al. | 260/112 R |
| 4,436,656 | 3/1984 | Sasaki et al. | 260/112 R |
| 4,436,657 | 3/1984 | Sasaki et al. | 260/112 R |

OTHER PUBLICATIONS

J. of Biol.-Chem. 258, No. 5, pp. 2911–2915, Mar. 10, 1983, Waite.
Science, 212, pp. 1038–1040 (1981), Waite et al.

Primary Examiner—Howard E. Schain
Attorney, Agent, or Firm—Prutzman, Kalb, Chilton & Alix

[57] ABSTRACT

A process is provided for purifying and stabilizing marine mussel polyphenolic proteins rich in 3,4-dihydroxyphenylalanine (dopa) and hydroxyproline (hyp) while obtaining high yields thereof. The process includes the steps of providing an acid soluble extract of the dopa-containing proteins, removing the low molecular weight material from the extract and reacting the remaining proteinaceous material with a water soluble borate at a pH of 7.0–9.0 to provide a soluble borate complex of the dopa-containing protein while precipitating impurities. The complex is separated from the precipitate and may be concentrated for storage or treated with an acetic acid solution and either concentrated or lyophilized and stored under an inert atmosphere. The purified proteins exhibit a dopa:protein index of purity ratio of at least about 0.10.

29 Claims, No Drawings

4,496,397

PROCESS FOR PURIFYING AND STABILIZING CATECHOL-CONTAINING PROTEINS AND MATERIALS OBTAINED THEREBY

BACKGROUND OF THE INVENTION

The present invention relates generally to polyphenolic proteins. More specifically it is concerned with a new and improved process for purifying and stabilizing catechol-containing proteins and with the stabilized proteinaceous materials obtained thereby.

As mentioned in my publication, *The Journal of Biological Chemistry*, Vol. 258, No. 5, pp. 2911-2915 (Mar. 10, 1983), several species of common marine mussels of the genus Mytilus secure themselves to solid substrates through a complex array of plaque-tipped collagenous byssal threads. The ends of these threads are rich in a polyphenolic adhesive substance that is mixed by the animal's foot with a curing enzyme (phenoloxidase) and a mucosubstance to provide a complex three-component natural adhesive system. The polyphenolic protein component of that system has been identified as a polymeric protein rich in 3,4-dihydroxyphenylalanine (dopa) (11 percent) and hydroxyproline (hyp) (13 percent). The amino acid composition of the polyphenolic proteins is reported by Waite and Tanzer in "Polyphenolic Substance of *Mytilus edulis:* Novel Adhesive Containing L-DOPA and Hydroxyproline" *Science,* Vol. 212, pp. 1038-1040 (1981). The disclosures within these publications are incorporated herein by reference.

These polyphenolic proteins are unique in their ability to adhere to substrates under the environmentally adverse and turbulent conditions in which the mussels exist. This is significant since, typically, adhesives are adversely affected by the presence of water on the substrates being adhered. Water competes with the adhesive for the surface, tends to hydrolyze the adhesive, and frequently plasticizes the adhesive. Accordingly, it is usually required that the substrate surfaces being adhered to be substantially free from water or other aqueous impurities. As can be appreciated, such conditions are not always possible, particularly for bioadhesives used in medical and dental applications and employing a wide variety of substrates such as those encountered when gluing or restoring fractured hard tissue in the body such as bone, cartilage, teeth, ligaments, blood vessels and the like.

The polyphenolic proteinaceous bioadhesive is also unusual in its superior strength characteristics which appear to be comparable to those achieved by synthetic cyanoacrylates. Since it can be applied to wet surfaces without prior drying, it may be considered to be superior to such adhesives. Further, the polyphenolic protein cures extremely rapidly, is nontoxic, and can be used in very fine or thin films exhibiting a coefficient of expansion similar to biological tissue.

As reported in the publications mentioned hereinbefore, the polyphenolic protein consists of a rather large polypeptide chain having a molecular weight of about 110,000 to 140,000 in which seven amino acids account for about 80 percent of all the amino acid residues within the peptide. A particular decapeptide sequence is given and it is stated that the reported sequence and related sequences may be repeated as often as 75 times in the polypeptide proteins. The reported presence of dopa and hydroxyprolines is unusual since dopa is only rarely encountered as a component of naturally occurring proteins and the hyroxyprolines are primarily associated with collagens having a high glycine content.

The isolation of the polyphenolic proteins reported hereinbefore involves treatment of dissected phenol glands of numerous mussels with a neutral salt buffer followed by extraction of the protein with acetic acid. As reported, the extraction is effective in providing a reasonable amount of the polyphenolic proteins. However, the acid soluble material at this stage of isolation and purification has a limited shelf life. This is believed to be due to many factors including the presence of collagen and dopa's susceptibility to facile oxidation to its quinone moiety. Dopa is an o-diphenol and readily forms quinones and semiquinones by photolysis, autoxidation and enzyme catalysis. Additionally, the protein is very sensitive to the presence of transition metal elements and tends to irreversibly coalesce with other proteinaceous materials still present within the acetic acid extract. It is known that other o-diphenols can chelate various metals, such as copper, iron, manganese, zinc, and nickel with high affinity. This characteristic is believed to contribute to sclerotization of the o-diphenol proteins.

While ion exchange techniques have been attempted as a means of achieving greater purification, it is recognized that yields of the proteins deteriorate drastically as a result of the extensive adsorption of the proteins by the ion exchange medium. In fact, up to 70 percent of the applied polyphenolic proteins are not recovered when using this technique. Gel filtration of the proteins using a variety of chromatographic materials and buffers generally results in very low or negligible yields. Although some materials permit recovery of the protein, they typically provide a limited fractionation range and generally are not preferred for purifying the bioadhesive proteins.

SUMMARY OF THE INVENTION

In accordance with the present invention, it has been found that the polyphenolic proteins can be both further purified and even stabilized under controlled pH conditions without the drastic yield reductions experienced heretofore. Due to the high conversion rate of the proteins to their stabilized form, it is now possible to retain significant quantities of the proteins for prolonged periods of time for subsequent utilization. The purified and stabilized material also facilitates isolation and storage of the protein in concentrated or dry form.

These and other advantages are achieved in accordance with the present invention by providing a new and improved process for purifying and stabilizing polyphenolic proteins rich in catechol that includes the steps of providing an acid soluble extract of the catechol-containing protein, removing from the extract those acid soluble materials having a low molecular weight to provide an extract fraction of relatively higher molecular weight catechol-containing proteins, reacting the extract fraction with a water soluble borate at a pH in the range of 7.0 to 9.0 to form selective soluble borate complexes of the proteins, and separating the borate complexes while maintaining the pH of the solution within the range of 7.0 to 9.0 to permit stabilized storage of the protein and subsequent use thereof. The borate complexes also may be treated with acetic acid to reduce the pH thereof into the range followed by concentrating or lyophilizing the acid solution under an inert atmosphere to obtain the purified proteins in solid form.

A better understanding of this invention will be obtained from the following description of the process including the several steps and the relationships of one or more of such steps with respect to each of the others, and the product resultant thereof which possesses the features, characteristic, compositions, properties, and relation of elements described and exemplified herein.

DESCRIPTION OF A PREFERRED EMBODIMENT

As mentioned hereinbefore, an acetic acid extract of the desired polyphenolic proteins can be obtained from various species of marine mussels of the genus Mytilus. The dissected phenol glands of the mussels are initially subjected to an extraction operation to remove the impurities and extraneous proteins therefrom. This takes place at a neutral pH in the presence of large amounts of a neutral or slightly basic buffer salt followed by gentle centrifugation. The buffer salt solution contains various protease inhibitors to prevent premature degradation of the proteins as well as materials to prevent enzymatic oxidation of the dopa residues prevalent in the proteins. The dissected and homogenized glands in effect simply undergo a washing procedure so as to remove the undesirable soluble impurities. After gentle centrifugation, the insoluble component is extracted with an acidic solution, such as a dilute acetic acid solution, in which the polyphenolic proteins are extremely soluble. The acid soluble proteins usually contain 20–40 micrograms of dopa per milligram of protein, the ratio of dopa to protein serving as an index of purification. This extraction procedure is fully described in the aforementioned publications and is preferably carried out at a cold temperature of less than about 10° C.; that is at a temperature range of about 1°–8° C. and preferably at about 4° C. In fact, all of the purifying techniques described herein are carried out at approximately the same low temperature unless otherwise stated.

The acid soluble polyphenolic proteins extracted in this manner have been found to have an apparent molecular weight, as determined by experimental techniques, falling within the range of about 110,000 to about 140,000. However, collagenase digestion of the proteins has indicated that the molecular weight of the collagenase-resistant fragments falls within the lower end of that range. The proteins are believed to be made up of from 60 to about 100 repeating units of a decapeptide formed from seven different amino acid residues. The sequencing of these residues is set forth in the first above-mentioned publication. Large amounts of dopa and hyp as well as the numerous hydroxyl groups in the polyphenolic proteins are believed to be largely responsible for the desired bioadhesive properties of the material, and it is believed that synthetic decapeptides of the same type or slight modifications thereof may be used to synthesize larger proteins possessing the desired adhesive capabilities of the naturally occurring materials.

In accordance with the present invention, the acid soluble proteins in the acetic acid extract are treated to separate and remove the lower molecular weight materials within the acid medium. Preferably, this is carried out by dialyzing the supernatant acetic acid extract against large volumes of dilute acetic acid using dialysis tubing having a molecular weight cut off of about 50,000 or less. In this connection, the material sold by Spectrum Medical Industries under the name "Spectra Pore" having an exclusion limit of 50,000 may be used with good success. The nondialyzable or high molecular weight fraction is then separated for the subsequent complexing operation. This initial dialysis of the acid soluble proteins is conducted against at least 20 volumes of acetic acid and frequently against as much as 500 volumes or more. The acetic acid concentration may vary from as little as 0.5 percent up to 5.0 percent but preferably is within the range of about 1–2 percent. The dialysis progresses for a significant period of time; that is, sufficient time to assure substantial if not complete removal of the lower molecular weight materials; e.g., for a period of about 5 or 6 hours.

As a result of this dialysis purification operation, it has been found that the total quantity of protein is reduced by at least 50 percent or more while the reduction in the amount of dopa present within the nondialyzable fraction is reduced by no more than about 10–15 percent. Thus, the remaining extract fraction clearly contains a significantly high amount if not most of the higher molecular weight dopa-containing proteins within the original proteinaceous material.

As mentioned, the extract fraction is further purified through the formation of a stable borate complex at slightly alkaline pH conditions. The yield of the complex is about 90 percent and more within the narrow pH range of about 7.0 to 9.0 but falls off sharply outside this range. Yields of 95–98 percent can be obtained within the preferred pH range of between 7.5 and 9.0. Accordingly, the treatment with the borate solution preferably takes place under these pH conditions in order to convert the highest possible amount of the polyphenol proteins to the borate complex moiety. This is significant for a number of reasons. As mentioned, the proteins are soluble in an acid environment but are normally insoluble under neutral and alkaline pH conditions. The borate complex of the dopa-containing proteins, however, stabilizes the proteins under the latter conditions. The o-diphenol materials exhibit intermolecular condensation and cross-linking reaction sites and are known to form covalent adducts and chelates of various metal ions. The borate complexes tend to stabilize these proteinaceous materials when most of the proteins' reactive sites are tied up by the borate. As mentioned, the fall-off in borate complex concentration is sharp on both sides of the pH range and therefore it is important to maintain the pH at or about 8.0–8.5.

In accordance with the preferred technique, the complexing is achieved by transferring the nondialyzable acid soluble extract of high molecular weight to a solution containing a soluble borate salt such as sodium borate at a pH within the selected range of 7.5 to 9.0 and extensively dialyzing the extract. A large relative volume of borate solution is employed with the solution having a borate concentration of 0.05 mole to 0.5 mole and preferably about 0.1 to 0.2 mole. The proteins are dialyzed for an extended period of time at the desired low temperature of less than 10° C. and preferably about 4° C. As a result of the prolonged dialysis, a white precipitate is formed in the nondialyzable fraction. This material is believed to be composed of uncomplexed proteins that are alkaline-insoluble; that is, insoluble under the dialysis conditions employed. The precipitate is believed to be predominantly collagen.

The nondialyzable complex fraction and the precipitate are subjected to centrifugation at about 15,000 to 50,000 × g for a brief period of time, up to about one hour, and the supernatant liquid is carefully separated from the white precipitate and collected. It has been found that while the total protein within the borate solution has been reduced to less than 10 percent of the initial quantity of proteinaceous material, the yield of dopa is within the range of about 70–80 percent of its initial quantity and the index of purification as measured by the dopa/protein ratio of at least about 0.10, thus indicating a highly purified state when considering the decapeptide structure believed to be the repeating unit of the bioadhesive proteinaceous material.

As can be appreciated, slight improvements in the purity of the desired component from each purification step can be achieved by repeating the various purification operations and pooling the desired components.

At this stage, the purified borate complex may be concentrated for storage and subsequent use. However, it is absolutely necessary that the required pH conditions be maintained and also that the borate molarity be maintained at a level greater than the molarity of the dopa by at least about 5–10 percent.

Alternatively, the purified borate complex may be reacidified and either concentrated or lyophilized in an inert atmosphere. The reacidification can readily be accomplished by redialyzing the borate complex against one or more changes of a 1 percent acetic acid solution. The material collected after a prolonged period of time such as six hours can be either stored cold in the 1 percent acetic acid solution, concentrated or lyophilized to obtain the purified proteins in their solid form. This can be achieved in accordance with known techniques under an inert atmosphere such as nitrogen.

The purified polyphenolic proteins obtained by this process can be analyzed for their amino acid content and in accordance with known techniques will produce a composition after acid hydrolysis containing 75–95 residues of dopa per 1,000 residues detected. Additionally, gel electrophoresis reveals that the impurities in the material are only visible upon massive overloading, suggesting that the impurity level within this gel is less than 10 percent. Further, as mentioned, reduction in the impurity level can be achieved by recycling the material through repetitive purification steps. However, some reduction in the yields of the materials are inevitable by recycling and are not preferred since the low impurity content of the material resulting from the process is usually of a satisfactory character.

As mentioned, the purified dopa-containing polypeptide contains repeated amino acid decapeptide sequences. Sequenator analysis reveals a sequence of NH$_2$ [alanine-lysine-proline-serine-tyrosine-hyp-hyp-threonine-dopa-lysine] COOH. Dopa is detected mostly at position nine penultimate to the carboxyl terminus, although significant amounts are also present with tyrosine at position five. The two hyps are located next to one another at positions six and seven, although additional hyp is present with proline at position three. The hyp is mostly 4-hydroxyproline although significant 3-hydroxyproline also occurs at position seven.

In order that the present invention may be more readily understood, it will be further described with reference to the following specific example which was given by way of illustration only and is not intended to be a limit on the practice of the invention.

EXAMPLE

About 300–400 specimens of the fresh mussel of the species Mytilus edulis were obtained and the phenol glands therefrom were removed by dissection at −20° C. The total weight of the glands thus obtained was about 40 grams. Of this amount, 8 grams were measured as protein and 0.08 gram was measured as dopa thus providing an index of purification of 0.01. The dissected glands were homogenized to a puree in 10 volumes of 1.0 M sodium chloride, 0.05 M Tris (pH 7.5) with 0.025 M EDTA, 10 mM N-ethylmaleimide, 1 mM phenylmethylsulfonyl fluoride, and 1 mM potassium cyanide at 4° C. The puree was centrifuged at 1,000 x g for five minutes and the supernatant liquid was disgarded. The solid pellet was resuspended in 5 volumes of 5.0 percent acetic acid and rehomogenized for two minutes. The resultant puree then was centrifuged for one hour at 40,000 x g. The supernatant liquid was collected and found to contain 3.4 grams of protein and 0.07 grams of dopa thereby indicating an index of purification of 0.021.

The supernatant liquid containing the acid soluble proteins was dialyzed against 100 volumes of 1 percent acetic acid for five hours and then transferred to 100 volumes of a 0.2 M sodium borate solution at a pH of 8.5 for another six hours. After this period, a white precipitate was observed in the nondialyzable fraction which was then centrifuged at 40,000 x g for 30 minutes, and the supernatant liquid was carefully collected. The collected material was analyzed and found to have a dopa-protein ratio of 0.10 with a recovery of 0.60 grams of dopa and 0.6 grams of protein. Based on these results and the lack of measurable impurities, the impurity level is believed to be less than 10 percent. The amino acid analysis produced a composition after acid hydrolysis of 75–95 residues of dopa per 1,000 residues detected. The yield of the purified product was 75 percent based on the initial and final dopa determinations as compared with less than 30 percent yield based on earlier methods.

A portion of the supernatant liquid was redialyzed against two changes of 400 volumes of 1 percent acetic acid for six hours. The nondialyzable material was collected and subjected to gel electrophoresis in an acid-urea buffer to identify the polyphenolic protein. A portion of this material was then stored cold while a second portion thereof was lyophilized to a dry powder under nitrogen.

As will be apparent to persons skilled in the art, various modifications, adaptations, and variations of the foregoing specific disclosure can be made without departing from the teachings of the present invention.

What is claimed is:

1. A process for purifying and stabilizing catechol-containing polyphenolic proteins comprising the steps of:
    (a) providing an acid soluble extract of a catechol-containing polyphenolic proteins in an acid medium;
    (b) removing from the extract those acid soluble components having a low average molecular weight to provide a remaining extract fraction of relatively higher molecular weight catechol-containing proteins;
    (c) reacting said remaining extract fraction with a soluble borate at a pH in the range of 7.0 to 9.0 to form selective soluble borate complexes of the catechol-containing proteins; and
    (d) separating the borate complexes while maintaining the pH between 7.0 and 9.0 to permit stabilized storage of the proteins and subsequent use thereof.

2. The process of claim 1 wherein the removal of low molecular weight components includes subjecting the extract to dialysis against a dilute acetic acid solution using a dialysis membrane having a molecular weight exclusion limit of 50,000 and less.

3. The process of claim 1 wherein each of the purification steps is carried out at a cold temperature of less than about 10° C.

4. The process of claim 1 wherein the reacting of the remaining extract fraction includes dialyzing the fraction against a large volume of a sodium borate solution for a period of time sufficient to complete at least about 90 percent of the complexing reaction.

5. The process of claim 1 wherein the water soluble borate reacted with the extract fraction has a molar concentration in the range of about 0.05–0.50 mole.

6. The process of claim 1 where the separation of the purified complexes includes subjecting the reaction mixture to centrifugation and collecting the supernatant liquid containing the stabilized complexes.

7. The process of claim 1 wherein the separated borate complexes are treated to reduce the pH to well below 7.0 to provide a purified acidic solution of the catechol-containing polyphenolic proteins and subsequently treating the acid solution to obtain the purified proteins for stabilized storage.

8. The process of claim 1 wherein the removal of low molecular weight materials includes subjecting the extract to dialysis against a large volume of a weak acid solution for a sufficient time to provide the remaining extract fraction; the reacting of the extract fraction includes dialyzing the fraction against a large volume of a borate solution at a pH in the range of about 7.5–9.0 and the separation of the complexes includes subjecting the reaction mixture to centrifugation for a brief period of time at high centrifugal force and collecting the supernatant liquid containing the stabilized complexes.

9. The process of claim 8 wherein each of the purification steps is carried out at a temperature of less than about 10° C.

10. The process of claim 8 wherein the separated borate complexes are treated to reduce the pH to a level well below 7.0 to provide a purified acidic solution of the catechol-containing polyphenolic proteins and subsequently treating the acid solution to obtain the purified proteins for stabilized storage.

11. The process of claim 1 wherein the separation of the purified complexes includes subjecting the reaction mixture to centrifugation while at a temperature of less than about 10° C. and at a pH in the range of about 7.5–9.0 and collecting the supernatant liquid containing the stabilized complexes, and subsequently concentrating the solution of catechol-containing proteins to obtain the purified proteins for stabilized storage.

12. The process of claim 11 wherein the collected borate complex-containing solution is treated to reduce the pH thereof to about 2.5–4 prior to concentrating the solution.

13. The process of claim 1 wherein the separated borate complexes are treated to reduce the pH to about 2.5–4 to provide a purified acidic solution of the catechol-containing polyphenolic proteins and subsequently lyophilizing the acid solution in an inert atmosphere to obtain the purified proteins in solid form.

14. The process of claim 1 wherein the separated borate complexes are treated to reduce the pH to about 2.5–4 by dialyzing the supernatant liquid containing the stabilized complexes against a large volume of a dilute acetic acid solution at a temperature of about 1°–8° C. to provide a purified acidic solution of the catechol-containing polyphenolic proteins.

15. The process of claim 1 wherein the removal of low molecular weight materials includes subjecting the extract to dialysis against at least about 500 volumes of a 1–5 percent acetic acid solution at a temperature of about 1°–8° C. using a dialysis membrane having a molecular weight cut off porosity of less than about 50,000 to provide the remaining extract fraction; the reacting of the remaining extract fraction includes dialyzing the fraction against at least about 500 volumes of a sodium borate solution at a pH in the ranqe of 7.5–8.5 at a temperature of 1°–8° C. for a period of time sufficient to complete at least about 90 percent of the complexing reaction; and the separation of the purified complexes includes subjected the reaction mixture to centrifugation of about 15,000–50,000 x g while at the same pH and collecting the supernatant liquid containing the stabilized complexes.

16. The process of claim 1 wherein the stabilized complexes are subsequently ooncentrated while maintaining the borate molarity at a level in excess of the molarity of the catechol by at least about 5–10 percent.

17. The process of claim 1 wherein the catechol is dopa, the removal of low molecular weight materials includes subjecting the extract to dialysis against an acetic acid solution at a temperature of about 4° C. to provide a remaining extract fraction; the reacting of the remaining extract fraction includes dialyzing the fraction against a sodium borate solution at a pH of about 8.0 and a temperature of about 4° C. for a period of time sufficient to complete about 95–98 percent of the complexing reaction and cause precipitation of selected noncomplexed proteins; the separation of the purified complexes includes subjecting the reaction mixture to centrifugation at about 30,000 x g while at a pH of about 8.0–8.5 and collecting the supernatant liquid containing the stabilized complexes of the dopa-containing proteins.

18. The process of claim 17 wherein the stabilized complexes of the dopa-containing proteins are subsequently concentrated while maintaining the borate molarity at a level in excess of the molarity of the dopa by at least about 5–10 percent.

19. The process of claim 17 wherein the stabilized complexes of the dopa-containing protein are treated to reduce the pH to about 2.5–4 by dialyzing the supernatant liquid containing the stabilized complexes against at least about 500 volumes of a 1–5 percent acetic acid solution at a temperature of about 1°–8° C. to provide a purified acidic solution of the dopa-containing polyphenolic proteins and lyophilizing the acidic solution under an inert atmosphere to obtain the purified proteins in solid form.

20. A purified and stabilized polyphenolic proteinaceous material comprising polypeptide proteins rich in 3,4 dihydroxyphenylalanine (dopa) and hydroxyproline (hyp) having a molecular weight in the range of about 110,000–140,000 with a repeated decapeptide having an amino acid sequence wherein dopa is sequenced predominantly at positions five and nine and hyp is sequenced predominantly at positions six and seven; said material having a dopa/protein index of purity ratio of at least about 0.10 and being free from collagens and other alkaline-insoluble proteins incapable of forming borate complexes at a pH of 7.0–9.0.

21. A solution of a borate complex of the purified and stabilized proteinaceous material of claim 20 wherein the solution has a pH in the range of 7.0–9.0 and the molarity level of borate in the solution exceeds that of dopa by at least about 5–10 percent.

22. The material of claim 20 where the proteinaceous material is in dry solid form under an inert atmosphere.

23. An acidic solution of the purified and stabilized proteinaceous material of claim 20 wherein the acid is acetic acid at an acid concentration of about 5 percent by weight and less.

24. The material of claim 20 wherein the decapeptide is repeated from 60 to 100 times within the polypeptide protein.

25. The purified and stabilized proteins obtained in accordance with the method of claim 1.

26. The purified and stabilized proteins obtained in accordance with the method of claim 8.

27. The purified and stabilized proteins obtained in accordance with the method of claim 11.

28. The purified and stabilized proteins obtained in accordance with the method of claim 17.

29. The purified and stabilized proteins obtained in accordance with the method of claim 19.

* * * * *